No. 774,690. PATENTED NOV. 8, 1904.
M. J. OWENS.
GLASS MELTING AND SHAPING DEVICE.
APPLICATION FILED DEC. 22, 1903.

NO MODEL. 3 SHEETS—SHEET 1.

Fig. 1.

Witnesses
Geo. H. Grover
Jas. P. Barry

Inventor
Michael J. Owens
By James Whitmore
atty.

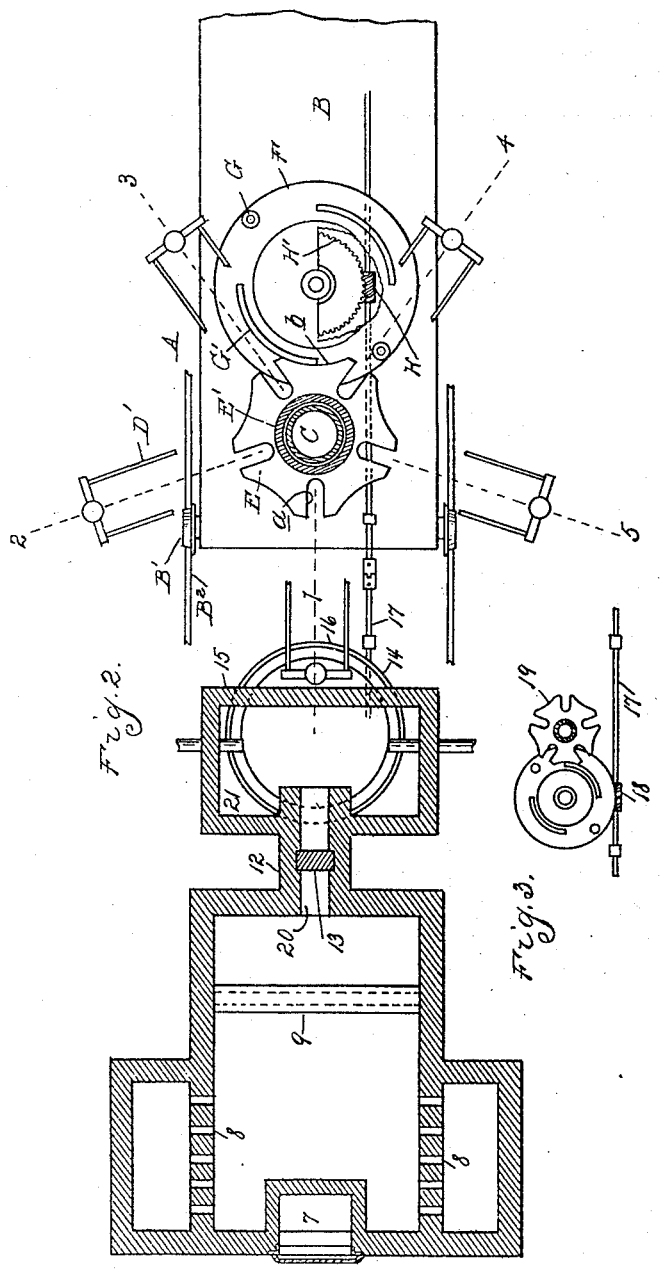

No. 774,690. PATENTED NOV. 8, 1904.
M. J. OWENS.
GLASS MELTING AND SHAPING DEVICE.
APPLICATION FILED DEC. 22, 1903.
NO MODEL. 3 SHEETS—SHEET 3.
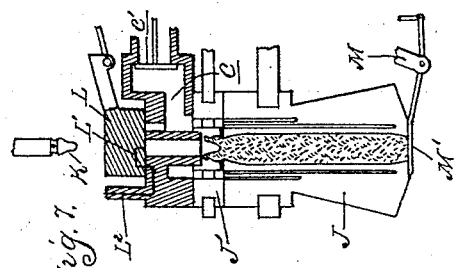
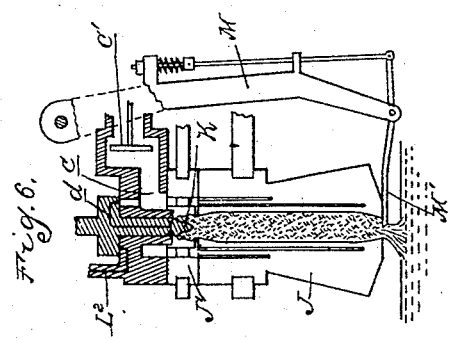
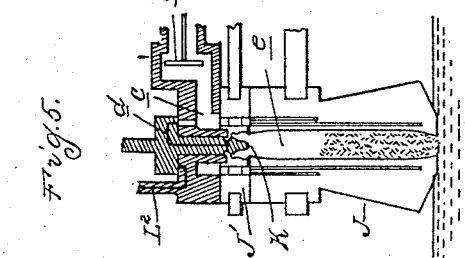
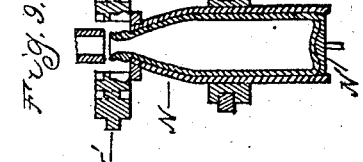
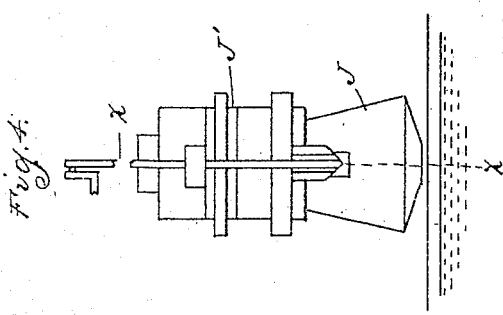
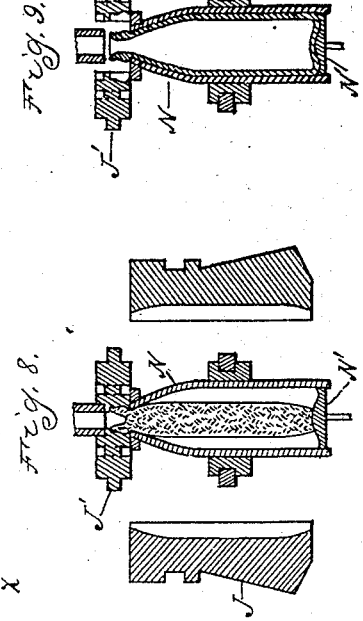
Inventor
Michael J. Owens
By James Whittemore
Atty.

No. 774,690. Patented November 8, 1904.

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS MELTING AND SHAPING DEVICE.

SPECIFICATION forming part of Letters Patent No. 774,690, dated November 8, 1904.

Application filed December 22, 1903. Serial No. 186,257. (No model.)

*To all whom it may concern:*

Be it known that I, MICHAEL J. OWENS, a citizen of the United States, residing at Toledo, in the county of Lucas and State of Ohio, have invented certain new and useful Improvements in Glass Melting and Shaping Devices, of which the following is a specification, reference being had therein to the accompanying drawings.

The invention consists in new and useful improvements in glass melting and shaping devices, as more fully hereinafter described, and particularly pointed out in the claims.

In the drawings, Figure 1 is a vertical central section through the melting-tank, the transfer mechanism, or temporary holder and showing in diagram elevation, partly in section, the gathering-machine coöperating therewith. Fig. 2 is a horizontal section through the tank and holder-casing and showing in diagram plan the various positions of the machine and the rotating mechanism therefor. Fig. 3 is a diagram plan illustrating the mechanism for intermittently rotating the tank. Fig. 4 is a front elevation of one of the gathering and blank-forming molds of the gathering-machine. Fig. 5 is a vertical section on line $x\,x$, Fig. 4. Fig. 6 is a similar section of Fig. 5, showing the parts in slightly different position. Fig. 7 is a section similar to Fig. 6, showing the parts in still different position. Fig. 8 is a section showing the blank-mold removed or open and the blowing or body mold in position about the blank for blowing; and Fig. 9 is a similar section showing the article blown in the body-mold.

The glass gathering and shaping machine shown at the right hand of Fig. 1 and lettered A is a type of machine previously invented by me and fully described in my Patent No. 766,768, dated August 2, 1904, and I do not deem it necessary here to describe all the details of its construction and operation, but briefly refer to its general mode of operation.

B is a base supported on wheels B', which run on suitable tracks B². Upon this base is a stationary post C, on which is journaled a frame D, adapted to be intermittently rotated, in this instance one-fifth of a complete revolution for each movement. On the frame D are a series of mold-frames D', in this instance there being five shown, and in Fig. 2 I have shown the different positions of these mold-frames at each stopping-point.

On the base of the cylindrical portion E' of the frame D is arranged a star-wheel E, having slots $a$, and opposite the star-wheel is arranged a disk F, having pins G thereon, adapted to engage the slot, and intermediate segments G', adapted to engage with the curved bearings $b$ on the star-wheel to hold the star-wheel and the mold-frame stationary while thus engaged, the star-wheel being rotated by the engagement of the pins in the slots. The disk F is rotated by a worm H engaging a worm-wheel H' on the under side of the disk F, this construction being shown in detail in my previous application and forming no part of my present invention.

The mold-frames D' are adapted to be raised and lowered by any suitable mechanism—such, for instance, as the lever I, engaging a camway I' on the stationary post C. This camway is so shaped that when a mold-frame reaches the station lettered $l$ in Fig. 2 it will be lowered and will be raised in leaving that position, traveling in a substantially horizontal plane the remainder of the distance. Each mold-frame preferably carries a sucking or blank-forming mold J, made in sections, the upper portion J' being in a separated section and being commonly called the "neck-mold" or "neck-ring" and likewise being made in two separable parts.

K is a pin or plunger projecting into the upper end of the neck-ring to form an indentation in the glass when it is gathered therein for the purpose of making an initial blow-opening.

$c$ is a connection to an air-exhaust device controlled by a valve $c'$, and this connection or channel $c$ connects, by the ports $d$ in the upper portion of the pin or plunger K, with the mold-cavity $e$ in the sucking-mold.

The stem K is adapted to be withdrawn, and when withdrawn a blowing-head L is by suitable mechanism moved into position above the sucking-mold, and this blowing-head has a passage L' therein adapted to register with the passage L², which is connected to a suitable source of air-supply under pressure controlled by a suitable valve. (Not shown.)

M is a lever carried by the mold-frame, at its lower end having a spring-pressed knife M', adapted to be moved across the lower end of the sucking-mold for the purpose of cutting off the glass, as illustrated in Fig. 6.

N is a body or blowing mold, as shown in Fig. 8, made in sections and adapted to inclose the blank when formed in the sucking-mold below the neck-ring.

N' is a suitable bottom for the blowing or body mold.

Suitable operating mechanism is provided for moving these various parts during the travel of the machine and while at the points of rest, and as these details form no part of my present invention, but are fully described in my previously-referred-to application, I will not here enter into a description thereof.

In the use of such a machine as that previously described it is necessary to bring the glass to it and to maintain that glass at a substantially uniform consistency for the successive gathering operations of the machine, and my present invention has particular relation to the glass-melting device and the transfer mechanism employed, together with the combination thereof with a machine which is adapted to take the glass in substantially uniform quantities after it leaves the melting-tank, as will be now described.

6 is a continuous melting-tank, being any suitable melting-tank of that type known as a "continuous" melting-tank, having preferably at one end an inlet 7, through which the batch for making the glass may be admitted. I have shown at 8 the gas-inlet openings for the gas to be used in melting the batch, and a cross-wall 9 between the melting-chamber 10 and the refining-chamber 11. At a suitable point, preferably opposite the opening 7, I provide an outlet 20 from the refining-chamber 11, out of which the glass may flow. This outlet I have shown controlled by a suitable gate-valve 13.

14 is a movable holder for the glass. In this case I have shown it in the shape of a circular tank arranged below the outlet from the continuous tank, so that the glass may flow directly from the continuous tank into the holder or tank 14.

15 is a casing which covers the greater portion of the temporary holder or tank 14, but leaves the portion 16 exposed outside the casing and at a point where one of the sucking-molds J may be moved into operative relation with the glass in the temporary holder. The holder or tank 14 I move, and in this case I rotate it. It may be moved either continuously or intermittently; but I have here shown an intermittent motion imparted to i by the drive-shaft 17, having a worm 18, an a similar star-wheel construction to that already described for the machine, which I have indicated at 19 and which is illustrated in detail in Fig. 3.

The parts being thus constructed, their operation is as follows: The batch being placed in the melting-chamber 10 and the gas ignited it will be melted and the glass formed in a molten mass, which will flow into the refining-chamber 11, and when the valve 13 is opened it will flow through the outlet into the rotary tank or holder 14, as plainly illustrated in Fig. 1. When the desired quantity of glass is obtained in the temporary holder, the machine is started, and one of the blank-molds being rotated over the portion 16 of the tank, the surface of the glass therein being exposed, as shown in Fig. 1, it will dip its lower open end into the molten glass, as shown in Fig. 1 and Fig. 5, and the air being exhausted from the cavity e in the sucking or blank mold the glass in the tank will be forced up into the mold-cavity to completely fill the same. The mold-cavity is preferably of the shape of a blank which may be blown, and devices are employed for making the indentation or blow-opening in the blank—such, for instance, as the pin K. When the blank is thus formed, the mold rises, and the cut-off M' will move across the lower end of the sucking or blank mold and sever the glass in the mold from that in the tank or holder. The core or pin K being then withdrawn and the lower portion of the sucking-mold being open, the body or blowing mold N is inclosed about the suspended blank, the bottom N' being in proper position, when air being admitted through the connection L² the article will be blown to its final shape, as shown in Fig. 9. When the mold dips into the glass in the temporary holder or tank 14, the cold metal will chill the glass at that point, so that if succeeding dippings take place at the same point the glass will have lost its plasticity and it will be difficult or impossible to gather the chilled glass into the mold. As soon as the mold is dipped and withdrawn from the molten glass the tank is moved, in this case by being rotated so that the point at which the dipping last took place is carried from the dipping-point of the mold, and a new and fresh surface is brought into place for subsequent operations. That portion of the glass which has been previously chilled by the dipping operation will be moved away from the dipping-point within the casing 15, where it will be reheated either by the heat in the molten glass around it or by the heat coming through the passage-way 20, through which the molten glass flows from the melting-tank, or I may employ separate heating means for the chamber 21 within the casing 15. I have shown for this purpose a gas-inlet 22, which will form a heating means for the glass in the tank or holder 14. In this way I am enabled to present to the machine glass of substantially uniform consistency and plasticity and at the same time to reheat that portion of the glass which has been chilled by the dipping operation.

It will be observed that the glass can flow continuously from the melting-tank into the temporary holder and that such temporary holder or tank acts as a transfer mechanism from the melting-tank to the machine, and I believe I am the first to employ any kind of transfer mechanism between the melting-tank having an outflow and a gathering-machine or blank-forming machine. I believe I am also the first to provide means to overcome the difficulties arising by the chilling of the glass due to the dipping operation by presenting a fresh surface for dipping for successive operations and also for reheating the chilled glass caused by the dipping and after reheating returning the same to the dipping or gathering point. I also believe that I am the first to devise a blank-forming machine which is adapted to take the glass which flows from an outlet in a melting or supply tank and shaping that glass into a blank which may be blown.

It is to be here noted that the glass is chilled to some extent by its surface exposure to the surrounding atmosphere, and while it is true that by dipping the mold into the glass the latter is surface-chilled at the dipping-point, yet it is also true that the glass is surface-chilled so as to require reheating by simply carrying it outside of the heating-chamber and exposing it to the atmospheric temperature surrounding the tank. In view of the above-stated fact it will be observed that it is equally as necessary to reheat the molten glass because of the lowering of the temperature thereof due to exposure as well as to reheat it on account of the chilling by dipping the mold.

Where I use the word "pool" in this specification I do not refer to the molten metal, but to the receptacle or container in which the molten metal is held.

What I claim as my invention is—

1. In apparatus for the manufacture of glass articles, a tank or holder for a mass of molten glass arranged to expose a portion of the surface of said glass at a dipping-point, in combination with means for bringing fresh portions of the mass of molten glass successively to said dipping-point, whereby the chilled glass produced by a dipping operation is carried away from the dipping-point and a fresh portion of the glass brought thereto for the next succeeding dipping operation.

2. In apparatus for the manufacture of glass articles, a tank or holder for a mass of molten glass arranged to expose a portion of the surface of said glass at a dipping-point, in combination with means for bringing fresh portions of the mass of glass successively to the dipping-point, and means for remelting the chilled portions of the mass of glass produced by the dipping operations and restoring them to the uniform consistency of the mass.

3. In apparatus for the manufacture of glass articles, a movable tank or holder for a mass of molten glass arranged to expose a portion of the surface of said glass at a dipping-point, in combination with means for moving said holder to bring fresh portions of the mass of molten glass successively to the dipping-point and withdraw the chilled portions therefrom.

4. In apparatus for the manufacture of glass articles, a movable tank or holder for a mass of molten glass arranged to expose a portion of the surface of said mass at a dipping-point, in combination with means for moving said holder to bring fresh portions of the mass of molten glass to the dipping-point and withdraw the chilled portions therefrom, and means for remelting such chilled portions after their withdrawal from the dipping-point, and restoring them to the uniform consistency of the mass.

5. In apparatus for the manufacture of glass articles, a movable tank or holder for a mass of molten glass, in combination with a cover therefor leaving a portion of the surface of the glass in the tank exposed at a dipping-point, and means for moving said holder to carry fresh portions of said glass from beneath the cover to the dipping-point and withdraw the chilled portions of the glass from the dipping-point and carry them beneath said cover.

6. In apparatus for the manufacture of glass articles, a movable tank or holder for a mass of molten glass, in combination with a heating-chamber located over said tank and constituting a cover therefor leaving a portion of the surface of the glass in the tank exposed at a dipping-point, and means for moving the tank to carry fresh portions of the mass of molten glass from the heating-chamber to the dipping-point and withdraw the chilled portions of the glass from the dipping-point and carrying them into the heating-chamber.

7. In apparatus for the manufacture of glass articles, a rotary tank or holder for a mass of molten glass, and a cover therefor leaving a part of the surface of the glass in the tank exposed at a dipping-point, in combination with means for rotating said tank to carry fresh portions of the molten glass from beneath the cover to the dipping-point and withdraw chilled portions of the glass from the dipping-point and carry them beneath the cover.

8. In apparatus for the manufacture of glass articles, a rotary tank or holder for a mass of molten glass, in combination with a heating-chamber located over said tank and forming a cover therefor leaving a part of the surface of the glass in the tank exposed at a dipping-point, and means for rotating said tank to carry fresh portions of the molten glass from the heating-chamber to the dipping-point and withdraw chilled portions of the glass from the dipping-point and carrying them into the heating-chamber.

9. In apparatus for the manufacture of glass articles, a movable tank or holder for a mass of molten glass, in combination with a stationary melting-tank arranged to deliver a constant supply of molten glass into the movable tank, and means for moving the latter tank to bring fresh portions of the molten glass to a dipping-point and withdraw chilled portions of the glass therefrom.

10. In apparatus for the manufacture of glass articles, a movable tank or holder for a mass of molten glass and a cover therefor leaving a portion of the surface of said mass of glass exposed at a dipping-point, in combination with a stationary melting-tank arranged to deliver a constant supply of molten glass into the movable tank beneath its cover, and means for moving the latter tank to carry fresh portions of the molten glass from beneath the cover to the dipping-point and withdraw chilled portions of the glass from said point and carry them beneath the cover.

11. In apparatus for the manufacture of glass articles, a movable tank or holder for a mass of molten glass, and a heating-chamber located over said tank, and forming a cover therefor leaving a portion of the surface of the glass in the tank exposed at a dipping-point, in combination with a stationary melting-tank arranged to deliver a constant supply of molten glass into the movable tank beneath the heating-chamber, and means for moving the latter tank to carry fresh portions of the molten glass from the heating-chamber to the dipping-point, and to withdraw the chilled portions of the glass from said point and carry them into the heating-chamber.

12. In apparatus for the manufacture of glass articles, a rotary tank or holder for a mass of molten glass, in combination with a stationary melting-tank arranged to deliver a constant supply of molten glass into the rotary tank, and means for rotating the latter tank to bring fresh portions of the molten glass to a dipping-point and withdraw chilled portions of the glass therefrom.

13. In apparatus for the manufacture of glass articles, a rotary tank or holder for a mass of molten glass, and a cover therefor leaving a portion of the surface of said mass of glass exposed at a dipping-point, in combination with a stationary melting-tank arranged to deliver a constant supply of molten glass into the rotary tank beneath its cover, and means for rotating the latter tank to carry fresh portions of the molten glass from beneath the cover to the dipping-point and withdraw chilled portions of the glass from said point and carry them beneath the cover.

14. In apparatus for the manufacture of glass articles, a rotary tank or holder for a mass of molten glass, and a heating-chamber located thereover and forming a cover therefor leaving a portion of the surface of the glass in the tank exposed at a dipping-point, in combination with a stationary melting-tank arranged to deliver a constant supply of molten glass into the rotary tank beneath the heating-chamber, and means for rotating the latter tank to carry fresh portions of the molten glass from the heating-chamber to the dipping-point and to withdraw the chilled portions of the glass from said point and carry them into the heating-chamber.

15. The combination of a rotary glass tank and a heating-chamber over a portion thereof, a portion of said tank projecting outside the heating-chamber to expose a portion of the glass for gathering purposes.

16. The combination with a gathering-machine having means for dipping into molten glass and gathering a quantity thereof, of a glass-supply device arranged in operative relation thereto, and means for causing glass of like plasticity to be brought into operative relation to the dipping-machine at successive operations.

17. The combination with a gathering-machine having means for dipping into molten glass and gathering a quantity therefrom, of a receptacle adapted to contain a supply of molten glass, and means for moving the receptacle to present a different dipping-point for successive operations of the gathering-machine.

18. The combination with a gathering-machine having means for dipping into molten glass and gathering a quantity thereof, of a tank or pool arranged in operative relation thereto, and means for moving the tank to present a different dipping-point for successive operations of the machine.

19. A movable tank adapted to contain molten glass, a cover over said tank constructed to expose a portion of the interior of the tank, means for moving the tank to bring the exposed portion within the cover, and to thereby expose other portions thereof.

20. The combination of a movable tank adapted to contain molten glass, a gathering-machine arranged in operative relation to said tank and having mechanism for dipping into and gathering a quantity of glass therefrom, a heating means for that portion of the tank which is away from the dipping-point, and means for moving the tank to successively bring new portions of the tank to the gathering-point and to the heating means.

21. The combination of a continuous melting-tank having an outflow, of a pool into which said tank discharges, and a gathering device adapted to gather glass from said pool.

22. The combination of a continuous melting-tank having an outflow, of a gathering-machine arranged adjacent to said tank, and a transfer device between the outlet of the tank and the gathering-machine.

23. The combination of a melting-tank having an outflow, of a gathering device arranged adjacent to the tank, a transfer device between the tank and gathering-machine and means for reheating the glass after it is chilled by the gathering-machine.

24. The combination of a melting-tank having an outflow, of a temporary holder into which the glass flows, and a gathering-machine arranged adjacent to said holder, and adapted to gather the glass therefrom.

25. The combination of a continuous melting-tank having an outflow, of a transfer mechanism adapted to receive the outflow and to transfer it to a shaping mechanism and coöperating shaping mechanism for taking definite portions of glass from the transfer mechanism, forming it into a blowing-blank, and giving said blank its final shape.

26. The combination of a continuous melting-tank having an outflow-opening of a shaping-machine adjacent thereto and mechanism in said machine for taking definite portions of the outflow, forming it into a blowing-blank, and giving said blank its final shape.

27. The combination of a continuous melting-tank having an outflow, of automatic mechanism for taking like definite quantities of the outflow from said tank, and coöperating automatic mechanism for shaping the gathered glass into a blank, and for expanding said blank into a hollow article.

28. In combination a melting-tank, a pool into which the glass from said melting-tank flows, said pool having a portion exposed to permit a gathering device to move therein mechanism for gathering like definite quantities of molten glass from the exposed portion of the pool and coöperating mechanism for shaping the gathered glass into a hollow article.

29. The combination of a tank or pool of glass having a cover over a portion, and a point or portion exposed, of a gathering-machine arranged adjacent to said tank adapted to gather glass from such exposed point or portion of the pool.

30. The combination of a continuous tank, a pool adapted to be supplied with molten glass from said tank, a cover for said pool having a point or portion exposed, and a gathering-machine adapted to gather glass from such exposed point of the pool.

31. The combination of a continuous melting-tank having an outflow, of automatic mechanism for taking like definite quantities of the outflow from said tank, and coöperating automatic mechanism for shaping the gathered glass into a blank, and for expanding said blank into a hollow article.

32. In combination a melting-tank, a pool into which the glass from said melting-tank flows, said pool having a portion exposed to permit a gathering device to move therein, mechanism for gathering like definite quantities of molten glass from the exposed portion of the pool, and coöperating mechanism for shaping the gathered glass into a hollow article.

33. The combination of a continuous melting-tank having an outflow, a transfer device for transferring the outflowing glass to a blank-mold, said mold, and coöperating means for forming a blowing-blank in said mold and blowing the same into a hollow article.

34. The combination of a melting-tank, having an outflow, of means for taking definite quantities of the outflow and delivering it to a shaping device, and coöperating means in the shaping device for forming the glass into a blank and blowing the blank into a hollow article.

35. The combination of a glass-furnace comprising a tank adapted to contain molten glass and a heating-chamber, the tank having a portion exposed to permit gathering therefrom, and mechanism for moving a portion of said furnace to expose a fresh portion of the tank and to reheat that portion previously exposed.

36. The combination of a melting-tank, of a glass-furnace into which the contents of the melting-tank are adapted to be discharged comprising a tank and heating-chamber thereover, the tank having a portion exposed to permit of gathering therefrom, and mechanism for moving a portion of said furnace to expose a fresh portion of the tank and to reheat that portion previously exposed.

37. The combination of a tank or holder and a casing forming a heating-chamber thereover, said casing being so constructed as to expose a portion of the surface of the tank, and means for exposing new portions of the tank and for bringing the previously-exposed portion into the heating-chamber for reheating, substantially as described.

38. The combination of a melting-tank having an outflow-opening, a movable tank into which the outflow is adapted to be delivered, a casing over said movable tank adapted to expose a portion thereof, and means for moving the tank so as to expose fresh portions thereof and to bring the previously-exposed portions within the casing to be reheated.

39. The combination of a receptacle adapted to contain molten glass having a portion only of its surface exposed to permit gathering therefrom, of means whereby fresh portions of the body of the glass can be presented at the exposed point for subsequent gathering operations.

40. The combination with a tank or pool adapted to contain molten glass having a portion only of its surface exposed for gathering, of means whereby the glass in the tank or pool
5 is moved to present a fresh portion thereof at the exposed point for subsequent gathering operations.

In testimony whereof I affix my signature in presence of two witnesses.

MICHAEL J. OWENS.

Witnesses:
   WM. S. WALBRIDGE,
   E. H. HOSE.